(12) United States Patent
Malinowski et al.

(10) Patent No.: US 8,370,405 B2
(45) Date of Patent: Feb. 5, 2013

(54) VARIABLE-LENGTH RECORD, CORRUPTION RECOVERY APPARATUS, SYSTEM, AND METHOD

(75) Inventors: Joseph Vincent Malinowski, Tucson, AZ (US); David Charles Reed, Tucson, AZ (US); Jeffrey Thomas Sheridan, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 12/355,981

(22) Filed: Jan. 19, 2009

(65) Prior Publication Data

US 2010/0185688 A1    Jul. 22, 2010

(51) Int. Cl.
*G06F 12/00* (2006.01)
*G06F 17/30* (2006.01)

(52) U.S. Cl. .................. 707/822; 707/821; 707/825
(58) Field of Classification Search .................. None
See application file for complete search history.

(56) References Cited

U.S. PATENT DOCUMENTS

| | | | |
|---|---|---|---|
| 3,629,860 A | | 12/1971 | Capozzi |
| 5,446,871 A | | 8/1995 | Shomler et al. |
| 5,568,639 A | * | 10/1996 | Wilcox et al. ............... 707/999.2 |
| 5,652,863 A | * | 7/1997 | Asensio et al. ............... 711/173 |
| 5,664,189 A | * | 9/1997 | Wilcox et al. ............... 707/690 |
| 5,668,991 A | | 9/1997 | Dunn et al. |
| 5,675,769 A | * | 10/1997 | Ruff et al. ..................... 711/173 |
| 5,737,520 A | * | 4/1998 | Gronlund et al. ............... 714/39 |
| 5,778,387 A | * | 7/1998 | Wilkerson et al. ..... 707/999.202 |
| 5,781,722 A | * | 7/1998 | Buches, Jr. ..................... 714/54 |
| 5,857,213 A | | 1/1999 | Benhase et al. |
| 5,870,762 A | * | 2/1999 | Lee ......................... 707/999.202 |

(Continued)

FOREIGN PATENT DOCUMENTS

| EP | 0119806 A2 | 9/1984 |
|---|---|---|
| WO | WO9634336 A1 | 10/1996 |

OTHER PUBLICATIONS

"Record Descriptor Word", IBM, 1990 URL: http://publib.boulder.ibm.com/infocenter/zvm/v5r4/topic/com.ibm.zvm.v54.dmsa5/dup0009.htm.*
Ouchi, NK, System for Blocking Variable Length Records, IBM Technical Document Bulletin, Sep. 1, 1973, TBD 09-73, pp. 1239-1240.

*Primary Examiner* — Fred I Ehichioya
*Assistant Examiner* — Garrett Smith
(74) *Attorney, Agent, or Firm* — Nelson and Nelson; Daniel P. Nelson; Alexis V. Nelson

(57) ABSTRACT

A method for identifying records of variable length within a data block containing corrupted data is disclosed herein. In certain embodiments, such a method may include scanning backward from an end of a data block containing variable-length records. The backward scan may proceed, one record at a time, to identify a first span of good (i.e., non-corrupt) records. The method may further include scanning forward from a front of the data block, also proceeding one record at a time, to identify a second span of good records. The method may include identifying a problem region by identifying data that resides between the first span and the second span. The method may also include creating a new record between the first span and the second span that contains the problem region. A corresponding computer program product, apparatus, and system are also disclosed.

18 Claims, 9 Drawing Sheets

U.S. PATENT DOCUMENTS

| | | | |
|---|---|---|---|
| 6,314,433 B1 * | 11/2001 | Mills et al. | 714/758 |
| 6,374,264 B1 | 4/2002 | Bohannon et al. | |
| 6,571,282 B1 * | 5/2003 | Bowman-Amuah | 709/219 |
| 6,816,451 B2 | 11/2004 | Xu et al. | |
| 6,954,746 B1 * | 10/2005 | Batista | 706/45 |
| 7,546,492 B2 * | 6/2009 | McCuller | 714/52 |

* cited by examiner

VARIABLE-LENGTH RECORD, CORRUPTION RECOVERY APPARATUS, SYSTEM, AND METHOD

BACKGROUND

1. Field of the Invention

This invention relates to data storage management systems, and more particularly to apparatus and methods for recovering corrupted data.

2. Background of the Invention

In a computing environment, data may be archived and accessed on a storage device by input and output operations ("I/O operations"). In certain computing environments (e.g., IBM mainframe operating environments) these input and output operations may be performed on blocks of data. A data block may contain smaller units of data known as records. In some applications, records are fixed-length, meaning that the records have the same length and can store the same amount of data. However, in other applications, records may be variable-length, meaning that the records may have different lengths and store different amounts of data.

Once loaded from a storage device into memory, data within a data block may be accessed by traversing the data block from record to record. Data within a data block containing variable-length records may be accessed using control information fields at the beginning of each variable-length record. These control information fields may indicate the length of the variable-length records in terms of bits or bytes.

To access data in a particular variable-length record, the preceding variable-length records may be traversed with the aid of the control information fields in each record. More specifically, the control information field in each record indicates the length of the record, and thus the distance that needs to be traversed to reach the subsequent record. Records may be traversed in this manner until a desired record is reached. Without accurate information in preceding control information fields, the ability to identify and access subsequent variable-length records becomes very difficult if not impossible.

Unfortunately, data blocks and the records contained therein, like many other data structures, may be subject to data corruption. Not only may data within records be subject to corruption, but data within the control information fields of these records may be subject to corruption. In a data block with one or more corrupted control information fields, individual records may become unidentifiable and thus inaccessible.

In view of the foregoing, what are needed are apparatus, systems, and methods to recover variable-length records in data blocks containing corrupted records and/or corrupted control information fields.

SUMMARY

The invention has been developed in response to the present state of the art and, in particular, in response to the problems and needs in the art that have not yet been fully solved by currently available methods, apparatus, and systems. Accordingly, the invention has been developed to provide improved methods, apparatus, and systems to identify variable-length records within a data block containing corrupted data. The features and advantages of the invention will become more fully apparent from the following description and appended claims, or may be learned by practice of the invention as set forth hereinafter.

Consistent with the foregoing, a method for identifying records of variable length within a data block containing corrupted data is disclosed herein. In certain embodiments, such a method may include scanning backward from an end of a data block containing variable-length records. The backward scan may proceed, one record at a time, to identify a first span of good (i.e., non-corrupt) records. The method may further include scanning forward from a front of the data block, also proceeding one record at a time, to identify a second span of good records. The method may include identifying a problem region by identifying data that resides between the first span and the second span. The method may also include creating a new record between the first span and the second span that contains the problem region.

In yet another embodiment of the invention, a computer program product for identifying variable-length records within a data block containing corrupted data is disclosed herein. In certain embodiments, the computer program product may include a computer-usable medium having computer-usable program code embodied therein. The computer-usable program code may include code to scan backward from an end of a data block containing variable-length records, one record at a time, to identify a first span of good records. Code also may be included to scan forward from a front of the data block, one record at a time, to identify a second span of good records. Furthermore, code may be included to identify a problem region by identifying data that resides between the first span and the second span. Also, code may be included to create a new record between the first span and the second span that contains the problem region.

In yet another embodiment of the invention, an apparatus for identifying variable-length records within a data block containing corrupted data is disclosed herein. Such an apparatus may include a backward scan module to scan backward from an end of a data block containing variable-length records. The backward scan module is configured to scan one record at a time to identify a first span of good records. The apparatus may also include a forward scan module to scan forward from a front of the data block. The forward scan module is configured to scan one record at a time to identify a second span of good records. Additionally, the apparatus may include an identification module to identify a problem region by identifying data that resides between the first span and the second span. Furthermore, the apparatus may also include a record creation module to create a new record between the first span and the second span that contains the problem region.

In yet another embodiment of the invention, a system for identifying variable-length records within a data block containing corrupted data is disclosed herein. The system may include a storage device to store a data block containing variable-length records and a memory to receive the data block. The system may also include a transfer module, configured to transfer the data block between the memory and the storage device, and a recovery module.

The recovery module may scan backward from an end of a data block containing variable-length records, one record at a time, to identify a first span of good records. The recovery module may also scan forward from a front of the data block, one record at a time, to identify a second span of good records. Furthermore, the recovery module may be configured to identify a problem region by identifying data that resides between the first span and the second span. The recovery module may be further configured to create a new record between the first span and the second span that contains the problem region.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
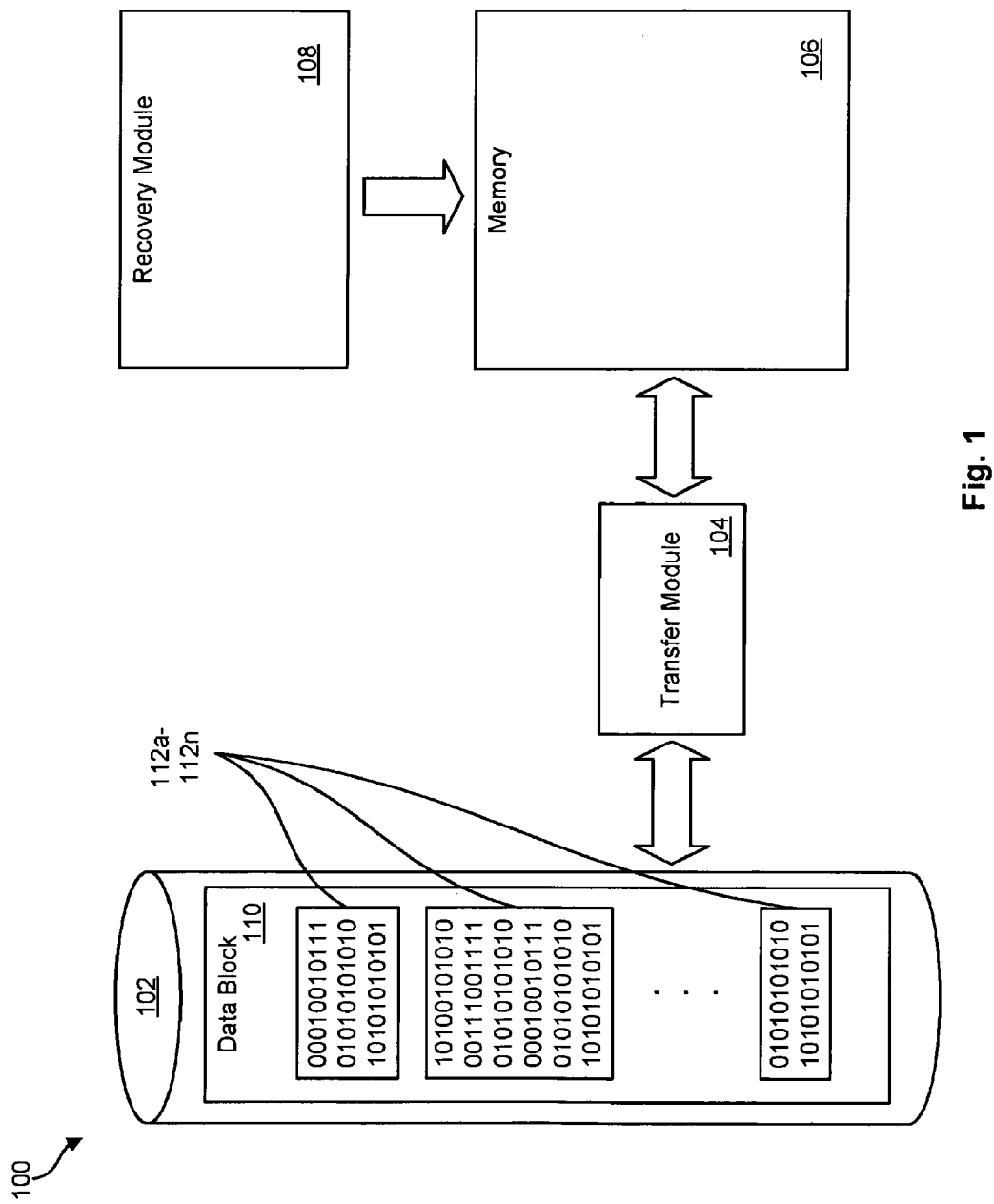
FIG. 1 is a high-level block diagram of one embodiment of a system for implementing a method and apparatus in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 depicts one embodiment of a system 100 for implementing a method and apparatus in accordance with the invention. In the illustrated embodiment, the system 100 includes a data storage device 102, a transfer module 104, memory 106, and a recovery module 108. The data storage device 102 may include a magnetic disk (e.g., hard disk), an optical disk, a flash drive, or any other data storage device best suited for a particular embodiment of the invention.

The data storage device 102 may be configured to store at least one data block 110. The data block 110 may contain records of variable length 112a-112n (collectively referred to hereinafter as "variable-length records" 112). The data block 110 may be a unit of data that the transfer module 104 transfers from the storage device 102 to the memory 106 or from the memory 106 to the storage device 102 during an I/O operation. In certain embodiments, the transfer module 104 may include a bus (not shown) that transmits data in a parallel, serial, synchronous, or asynchronous manner. In some embodiments, the transfer module 104 performs data transfer over a network in connection with additional subsystems known to those of ordinary skill in the art.

The recovery module 108 may be configured to scan the data block 110 once it has been transferred into memory 106. In certain embodiments, the recovery module 108 scans each data block in memory 110 to determine whether there is data corruption that makes one or more records unidentifiable. In certain embodiments, the recovery module 108 is triggered or initiated when an application that is accessing the records 112 generates an error message, thereby indicating that data corruption may be present. Additional methods for initially detecting the presence of corruption are also possible. Once corruption is detected, the recovery module 108 may be invoked.

The recovery module 108 may be configured to scan the data block 110 and identify good (i.e., non-corrupt or substantially non-corrupt) records 112 therein. Additionally, the recovery module 108 may modify the data block 110 so that one or more records 112 are identifiable. Furthermore, the recovery module 108 may be configured to identify a problem region within the data block 110 where data corruption exists or may exist. Additional functions of the recovery module 108 will become apparent in the discussion below. After the recovery module 108 has finished scanning and/or modifying the data block 110, the transfer module 104 may store the data block 110 in the storage device 102.

Figure 2:
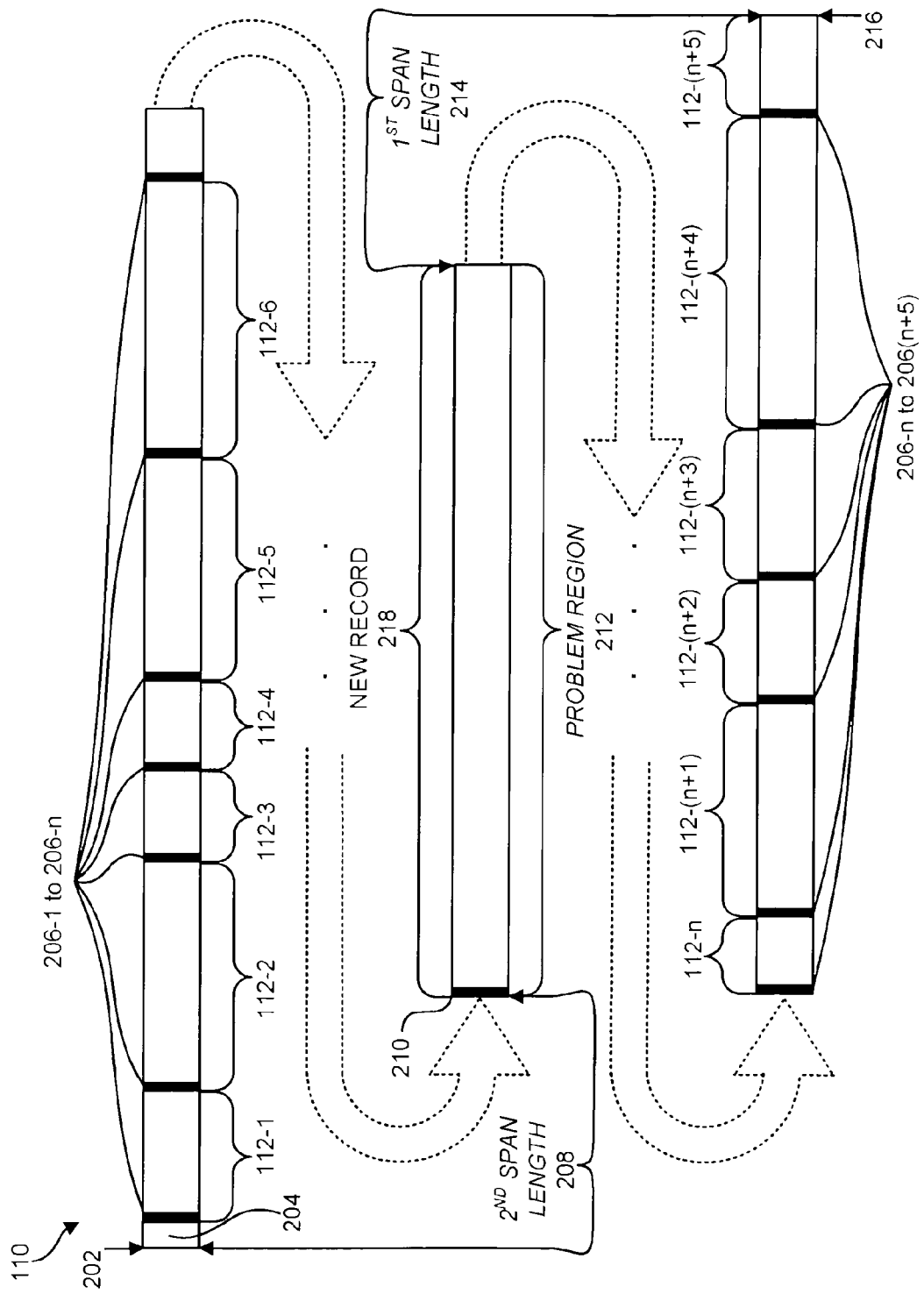
FIG. 2 is a high-level block diagram showing a data block containing variable-length records.

FIG. 2 shows one example of a data block 110 containing records 112 of various lengths, wherein data corruption makes one or more of the records 112 unidentifiable and thus inaccessible. In certain embodiments, the data block 110 may include a front 202, metadata 204, control information fields 206-1 to 206-7 (collectively referred to herein as "control information fields" 206), a second span length 208, a corrupted control information field 210, a problem region 212, a first span length 214, an end 216, and a new record 218. The front 202 and the end 216 represent the beginning and end of the data block 110 respectively.

In certain embodiments, the metadata 204 may include data about the records 112 within the data block 110. For example, in certain embodiments, the metadata 204 may include the number of records 112 within the data block 110, the length of the data block 110, and/or additional information about the data block 110 and/or records 112 within the data block 110. The length of the metadata 204 may be a standard length, such as fourteen bytes. The length of the metadata 204, however, may be any number of bytes or bits.

In certain embodiments, a default offset may be used to locate a first control information field 206-1 immediately after the metadata 204. In other embodiments, the offset is derived from user input. In any case, an offset may be identified to locate a first control information field 206-1 within the data block 110.

As mentioned, each record 112 in the data block 110 may include a control information field 206 containing metadata about the record 112. In certain embodiments, the control information fields 206 may be Record Descriptor Words (as in IBM mainframe computing environments). Each control information field 206 may include a length indicator storing the length of the record 112 to which it pertains. In some embodiments, the length indicator stores the length of the control information field 206 in addition to the length of the record following the control information field 206. In other embodiments, the length indicator simply stores the length of the record following the control information field 206.

The second span length 208 may refer to the total length of records 112 from the front 202 of the data block 110 to an identified problem region 212. In certain embodiments, the second span length 208 may include a total number of verified records and/or a total number of units from the front 202 of the data block 110 or from the end of the metadata 204. The units may be defined in terms of bits, bytes, words, or any other unit appropriate to the particular embodiment.

A corrupted control information field 210 may reside at the end of the second span 208. The corrupted control information field 210 may contain corrupted length indicator information. Additional corruption in the corrupted control information field 210 may also be present. Since the length indicator is incorrect, a forward scan of the data block 110 will be unable to identify any remaining correct control information fields 206-$n$ to 206-($n$+5), and thus any remaining good records 112-$n$ to 112-($n$+5).

A problem region 212 may include data between the corrupted control information field 210 and the front of the first span length 214. Data within this problem region 212 may be at least partially corrupt. The first span 214 begins at the end of the problem region 212.

Like the second span length 208, the first span length 214 may refer to the total length of records 112 from the end 216 of the data block 110 to the end of the problem region 212. The first span length 214 may include a total number of verified records 112 and/or a total number of units from the end 216 of the data block 110. As with the second span length 208, the units may defined in terms of bits, bytes, words, or any other unit appropriate to the particular embodiment.

In certain embodiments, the corrupted control information field 210 may be rewritten to include a length indicator equal to the length of the problem region 212. As a result, a new record 218 may be created that includes the problem region 212. The new record 218 will allow the remaining control information fields 206-$n$ to 206-($n$+5) to be located and identified when scanning the data block 110. Once identified, the remaining control information fields 206-$n$ to 206-($n$+5) will allow the remaining records 112-$n$ to 112-($n$+5) to be accessed and identified.

Figure 3:
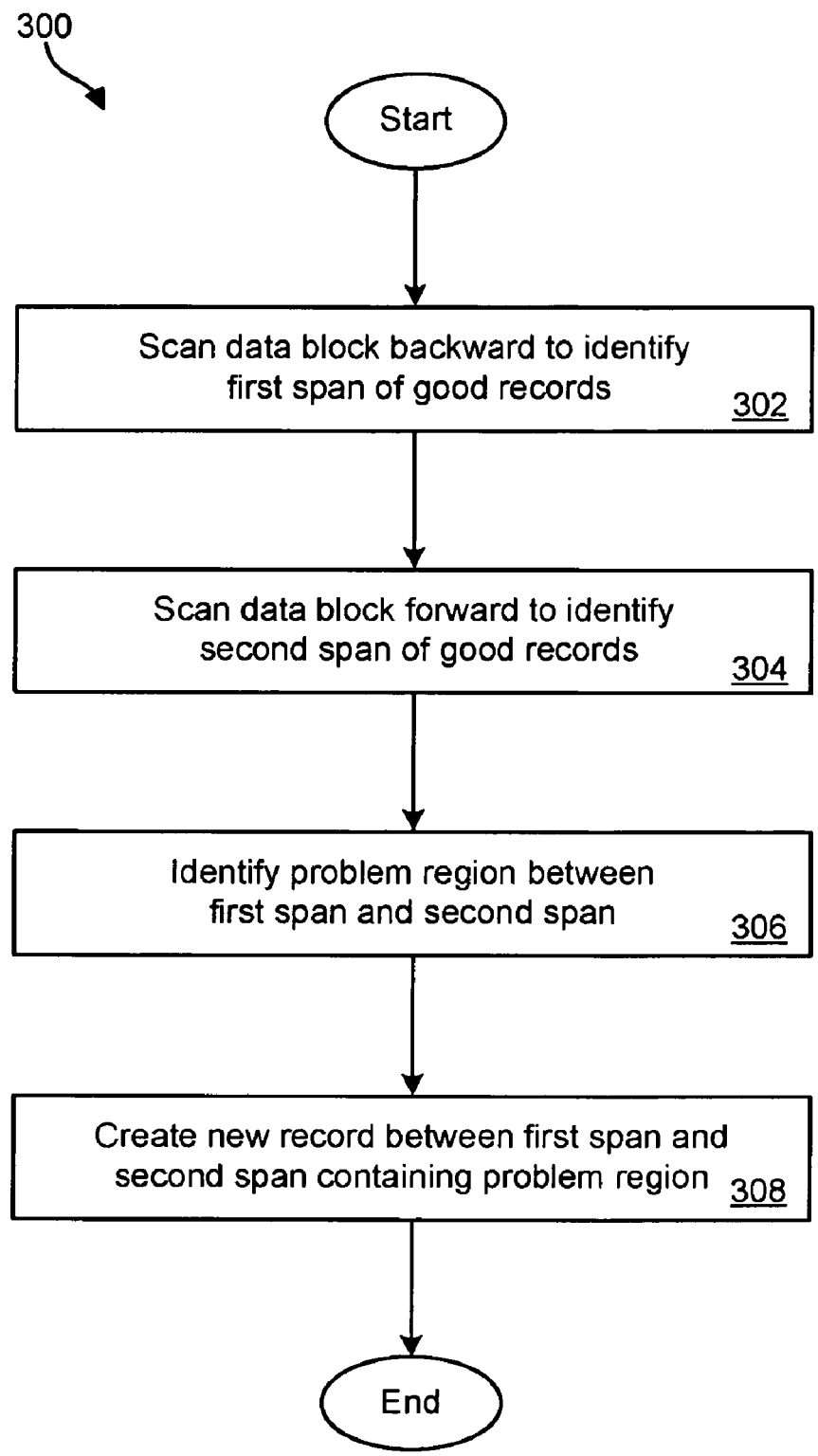
FIG. 3 is a flow chart of one embodiment of a method for identifying variable-length records in a corrupted data block.

FIG. 3 depicts one embodiment of a method 300 for identifying good variable-length records 112 within a corrupted data block 110. The method 300 may begin with a backward scan 302 of the data block 110 starting from the end 216 of the data block 110. This backward scan 302 may proceed, one record 112 at a time, to identify a group of good records 112 adjacent to the end 216 of the data block 110. A good record 112 may be considered a record 112 with an un-corrupted length indicator in its control information field 206. The backward scan 302 may continue until a first span 214 of good records 112 is identified.

The method 300 may continue with a forward scan 304 beginning from the front 202 of the data block 110. This forward scan 304 may proceed, one record 112 at a time, to identify a group of good records 112 adjacent to the front 202 of the data block 110. The forward scan 304 may proceed until a second span 208 of good records 112 is identified. As will be explained in more detail hereafter, a second span length 208 may be calculated by locating a corrupted control information field 210 and measuring the length between the front 202 and the corrupted control information field 210.

Once the first span length 214 and the second span length 208 have been identified, the method 300 may proceed by identifying 306 a problem region 212. The problem region 212 may be identified as data that resides between the first span length 208 and the second span length 214. This problem region 212 may or may not include portions of the corrupted control information field 210.

The method 300 may then proceed by creating 308 a new record 218 that contains the problem region 212, which may contain corrupted data. This may be accomplished by overwriting the corrupted control information field 210 with a new control information field 210. The length indicator of this new control information field 210 may correspond to the length of the problem region 212. The new record 218 may also allow the control fields 206 and records 112 within the first span length 214 to be located when reading the data block 110.

In certain embodiments, because the new record 218 may contain corrupted data, the new record 218 may be skipped over when reading the data block 110. In other embodiments, some or all of the data in the new record 218 may be rewritten with new, uncorrupted data. In yet other embodiments, one or more data recovery algorithms may be applied to the data in the new record 218 in an attempt to recover any uncorrupted data therein.

Figure 4:
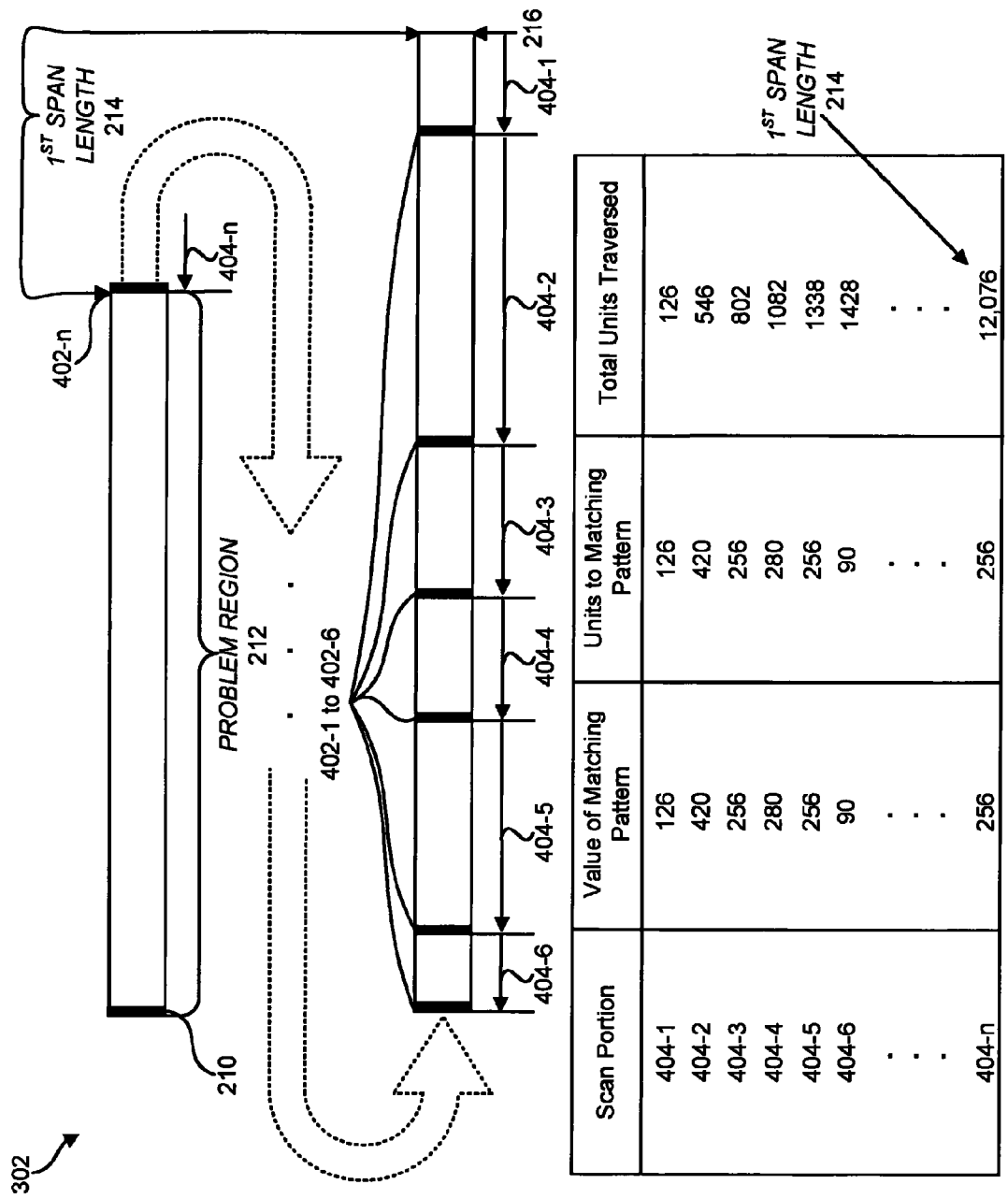
FIG. 4 is a high-level block diagram showing one method for scanning backward from an end of a data block containing variable-length records, as set forth in the method of FIG. 3.

FIG. 4 depicts one embodiment of the backward scan step 302 described in FIG. 3. The step of scanning backward 302 may include a number of scan portions 404-1 to 404-n (collectively referred to herein as "scan portions" 404 and individually/generically as a "scan portion" 404). During the backward scan 302, a count value of units read may be maintained for each scan portion.

For example, for the first scan portion 404-1, a count value is incremented for each unit read during the backward scan 302. A unit may be defined in terms of bits, bytes, words, or any other unit appropriate to the embodiment. The count value may be incremented until a bit pattern 402-1 to 402-n (collectively referred to herein as "scan portions" 402 and individually/generically as a "scan portion" 402) is read having a value equal to the count value. The first scan portion 404-1 reaches its end when the first bit pattern 402-1 having a value equal to the count value is read. This will indicate that a length indicator in the control information field 206 of a record 112 has been reached, and thus the front of a record has been reached. The count value equal to the first bit pattern 402-1 may be recorded and the count value may be reset.

The backward scan 302 may continue to a second scan portion 404-2 until a second bit pattern 402-2 equals the previously reset count value. This will indicate that the next length indicator in the next control information field 206 has been reached, and thus the front of the next record has been reached. The backward scan 302 may continue in this manner by recording and resetting the count values upon encountered matching bit patterns 402. The backward scan 302 may continue until arriving at the front 202 of the data block 110 without reading another matching bit pattern 402. Upon arriving at the front 202 of the data block 110, the last matching bit pattern 402-n may define the last scan portion 404-n.

The length of the first span 214 may be identified as the total number of units traversed to the final matching bit pattern 402-n. The total number of units traversed may be determined by summing each count value that was recorded.

The first span length 214 may include a number of verified records 112 believed to be free of corruption. Bit patterns 402 may include additional information, such as identification bits, in addition to bits dedicated for a length indicator. As the length of the bit patterns 402 increases, the probability increases that the records 112, or at least that the length indicators within the corresponding control information fields 206, are corruption free. For example, the probability of a coincidental match between random bits not pertaining to a length indicator from a control information field 206 decreases for a bit pattern length of 4 units as opposed to 2 units.

Figure 5:
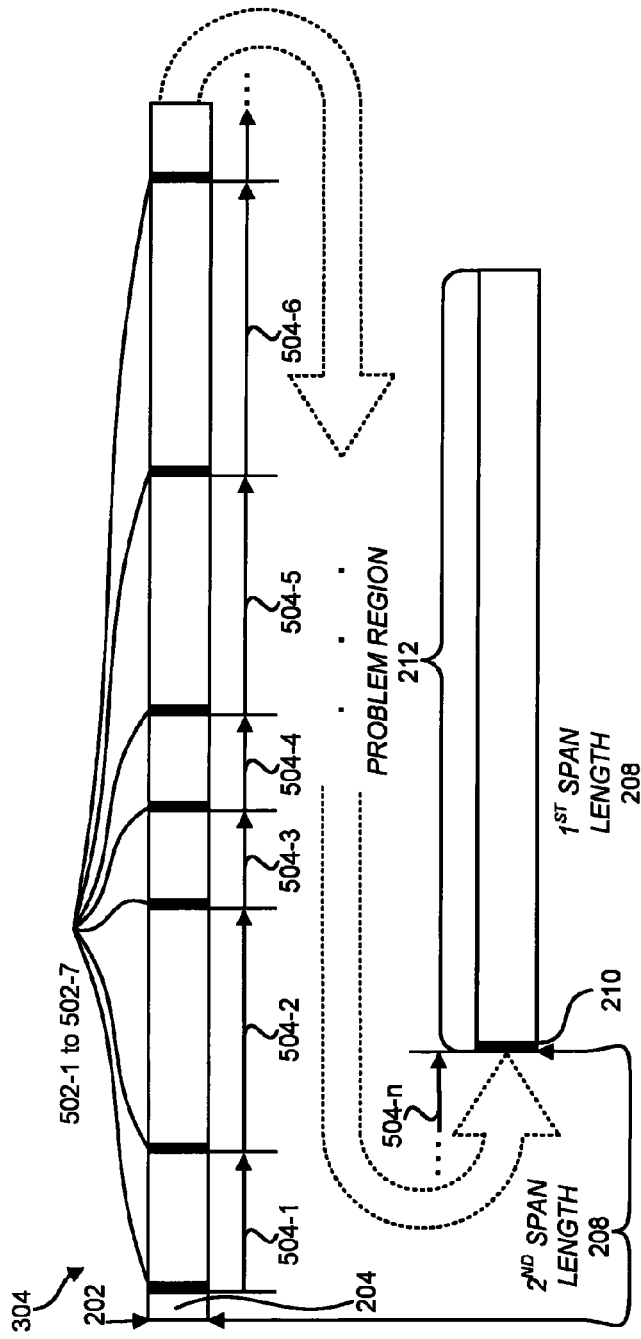
FIG. 5 is a high-level block diagram showing one embodiment of a method for scanning forward from a front of a data block containing variable-length records, as set forth in the method of FIG. 3.

FIG. 5 depicts one embodiment of the forward scan step 304 described in FIG. 3. The step of scanning forward 304 may also include a number of scan portions 504-1 to 504-n (collectively referred to herein as "scan portions" 504 and individually and generically as a "scan portion" 504). The scan portions 504 are defined by bit patterns 502-1 to 502-n (collectively referred to herein as "bit patterns" 502 and individually and generically as a "bit pattern" 502). The bit patterns 502 include the length indicators within the control information fields 206.

During the forward scan 304, an offset may determine how far forward to scan to reach the first bit pattern 502-1, residing after the metadata 204. The value of the first bit pattern 502-1 (which includes the control information field 210 and thus the length indicator) then determines how far forward to scan to reach the next bit pattern 502-1. The forward scan 304 continues to scan from bit pattern 502 to bit pattern 502 based on the number of units indicated by the value (i.e., the length indicator) of each bit pattern 502.

As the forward scan 304 progresses, a running total of units scanned from the front 202 of the data block 110 to a present location may be maintained. The running total may or may not include units in the metadata 204. Additionally, a computation is made upon arriving at each bit pattern 502.

The computation begins with a total block length. In some embodiments, the total block length is provided in the metadata 204. In other embodiments, the total block length is determined after a preliminary scan of the data block 110 that counts the number of units in the data block 110, or in some other manner. From the total block length, the running total of units traversed is subtracted. In addition to the running total, the value of the first span length 214, in units, as obtained from the backward scan 302, is also subtracted from the total block length. From the computation, a result is obtained.

The result is then compared to the value of the current bit pattern 502. In the event that the result is less than the value of the bit pattern 502 at the present location, the forward scan 304 proceeds for another scan portion 504 and again performs the above-described computation. In the event that the result is greater than the value of the current bit pattern at the present location, a complete record 112 could not fit between the present location and the remaining records 112 within the first span length 214. This will indicate that the corrupted control information 210 is located at the present location.

Once the value of the bit pattern 502 at the present location is greater than the result, the second span length 208 may be determined. The second span length 208 may be determined based on the running total at the present location. In certain embodiments, the second span length 208 may be equal to the running total less the length of the bit pattern 502 at the present location.

Figure 6:
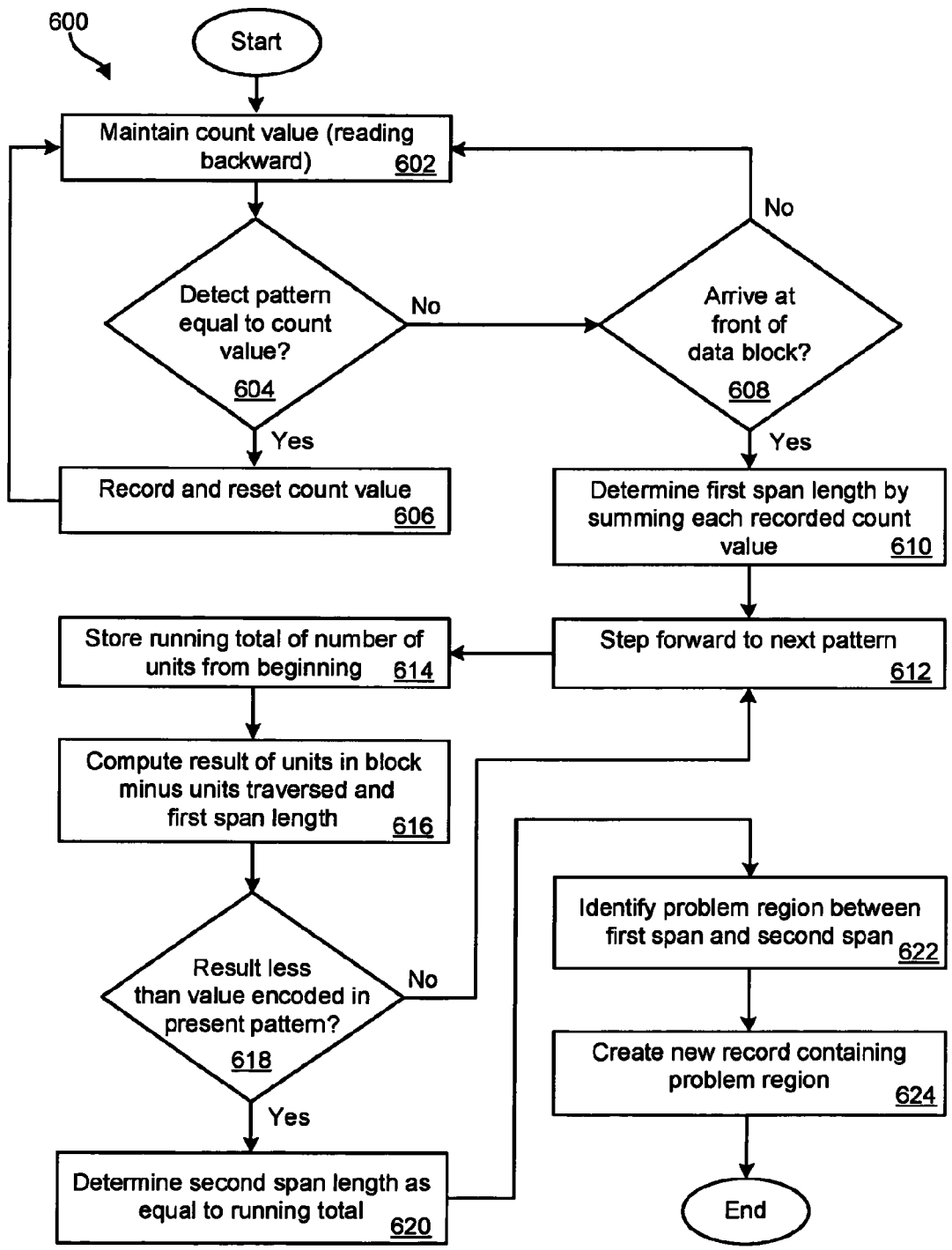
FIG. 6 is a flow chart showing one embodiment of a method for identifying variable-length records in a corrupted data block, and employing steps substantially similar to those depicted in FIGS. 4 and 5.

FIG. 6 depicts one embodiment of a method 600 for identifying good variable-length records in a corrupted data block 110 that employs a backward scan step 302 and a forward scan step 304 substantially similar to those depicted in FIGS. 4 and 5, respectively. The method 600 starts with the backward scan step 302 by maintaining 602 a count value of units traversed while scanning bit patterns 402 in a data block 110. The count value is incremented with every unit scanned. The method 600 then determines 604 whether a pattern equal to the count value has been detected. If the determination 604 is affirmative, the method 600 records 606 the count value and resets 606 the count value.

If the determination 604 is negative, the method 600 determines 608 whether the backward scan 302 has arrived at the front 202 of the data block 110. In the event the determination 608 is negative, the method 600 continues to maintain 602 the count value as the backward scan 302 continues. In the event the determination 608 is affirmative, the method 600 may end the backward scan 302. The method 600 may then determine 610 a first span length 214 by summing each recorded count value.

The method 600 may then progress forward 612 from bit pattern 502 to bit pattern 502 as part of a forward scan 304 from the front 202 of the data block 110. As the method 600 performs the forward scan 304, the method 600 may store 614 a running total of a number of units traversed from the beginning point of the forward scan 304.

As the method 600 performs the forward scan 304, the method 600 may make a computation 616. This computation 616 may involve taking the total number of units in the data block 110, or some approximation thereof, and subtracting both the running total of units traversed, or some approximation thereof, and the first span length 214, or some approximation thereof.

The method 600 may then determine 618 whether the result is less than the value encoded in a bit pattern 502 at the present location. If the determination 618 is negative, the method 600 may continue with the forward scan 304 and step forward 612 to the next bit pattern 502.

If the determination 618 is affirmative, the method 600 may determine 620 a second span length 208 as equal to the running total. The method 600 may then identify 622 a problem region 212 with potential data corruption between the first span 214 and the second span 208. The method 600 may then create a new record 218 at the present location that contains the problem region 212.

Figure 7:
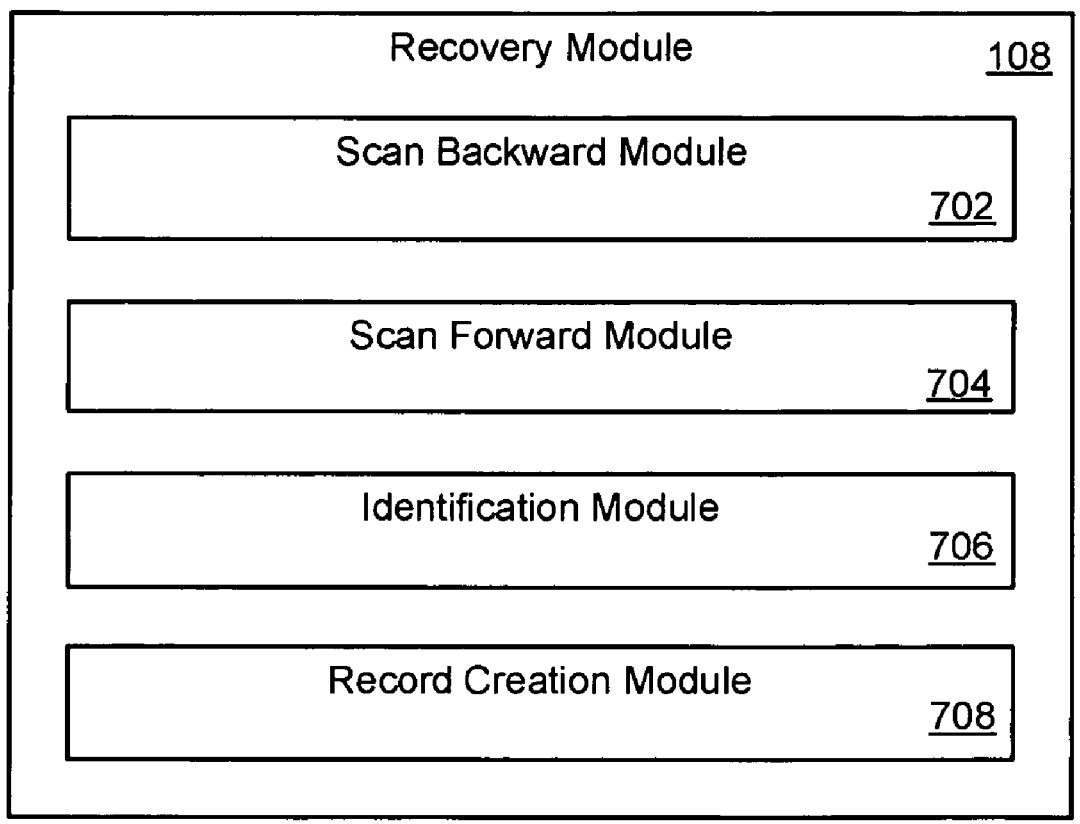
FIG. 7 is a high-level block diagram showing one embodiment of an identification module in accordance with the invention.

FIG. 7 is a high-level block diagram showing one embodiment of a recovery module 108 in accordance with the invention. In certain embodiments, the recovery module 108 may include a scan backward module 702, a scan forward module 704, an identification module 706, and a record creation module 708. These modules may work together to identify good variable-length records 112 in a data block 110 that is at least partially corrupted.

The scan backward module 702 may be configured to determine a first span length 214. The scan backward module 702 may scan the data block 110, one record at a time, starting from an end 216 of the data block 110. Using this technique, the scan backward module 702 may identify good records 112 that are adjacent to the end 216 of the data block 110. A first span length 214 may then be calculated based on these good records 112.

Similarly, the scan forward module 704 may be configured to determine a second span length 208. The scan forward module 704 may scan the data block 110, one record at a time, starting from a point at or near the front 202 of the data block 110. Using this technique, the scan forward module 704 may identify good records 112 adjacent to the front 202 of the data block 110. A second span length 208 may then be calculated based on these records 112.

The identification module 706 may be configured to identify a region 212 of potentially corrupted data by identifying data that resides between the first span 214 and the second span 208. A record creation module 708 may create a new record 218 between the first span 214 and the second span 208 that contains the problem region 212.

Figure 8:
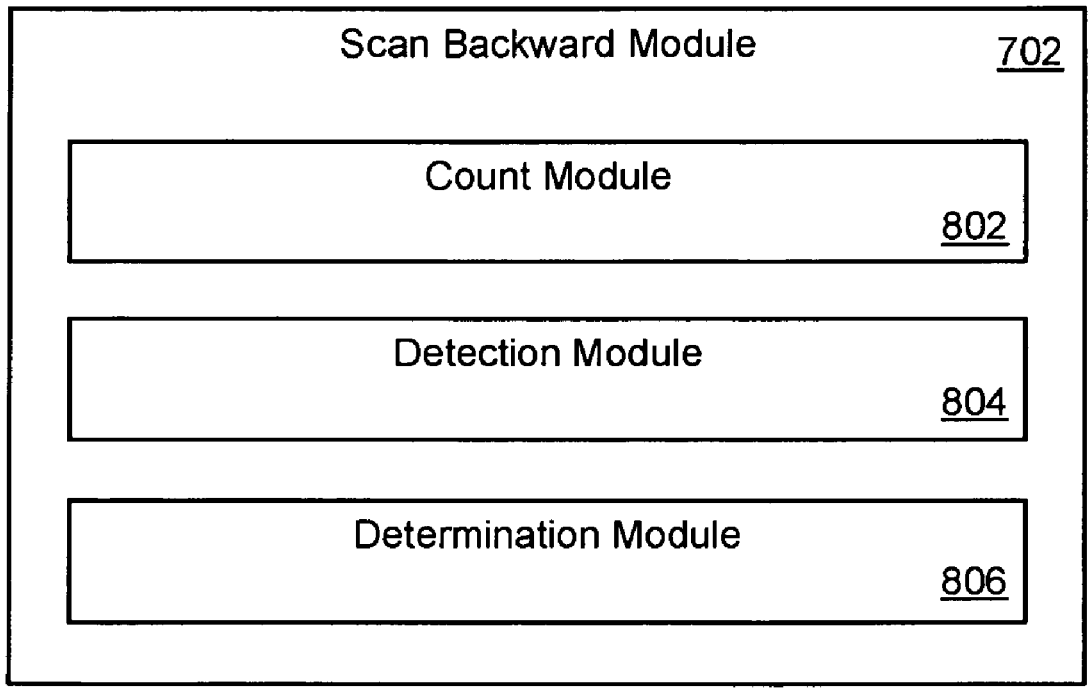
FIG. 8 is a high-level block diagram showing one embodiment of a scan backward module in accordance with the invention.

FIG. 8 depicts a high-level block diagram of one embodiment of a scan backward module 702 in accordance with the invention. In selected embodiments, the scan backward module 702 may include a count module 802, a detection module 804, and a determination module 806.

The count module 802 may maintain a count value of the number of units traversed while reading bit patterns 402 of the data block 110 in a backward direction. The detection module 804 may record and reset the count value upon reading a bit pattern 402 that matches the count value. Upon arriving at a point at or near the front 202 of the data block 110, the determination module 806 may be configured to determine a first span length 214 by summing each count value that was recorded.

Figure 9:
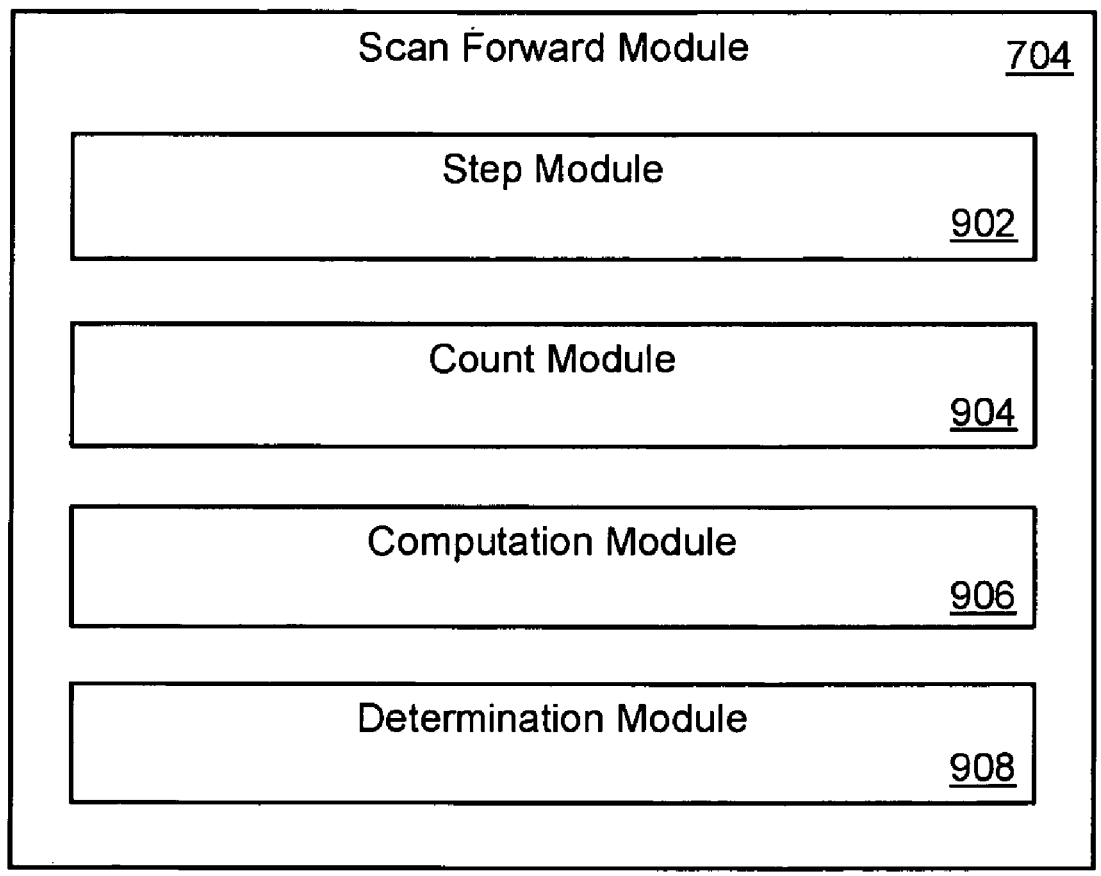
FIG. 9 is a high-level block diagram showing one embodiment of a scan forward module in accordance with the invention.

Referring to FIG. 9, a high-level block diagram of one embodiment of a scan forward module 704 is depicted. In certain embodiments, the scan forward module 704 may include a step module 902, a count module 904, a computation module 906, and a determination module 908.

The step module 902 may be configured to scan forward from bit pattern 502 to bit pattern 502 (i.e., from control information field 206 to control information field 206), by moving forward a number of units equal to the value of each bit pattern 502. The count module 904 may be configured to store a running total of units from a point at or near the front 202 of the data block 110 to a present location. The computation module 906 may, upon arriving at each bit pattern 502, subtract from a total block length a sum of both the running total and the first span length 214 to obtain a result. When the value of the bit pattern 502 at the present location is greater than the result provided by the computation module 906, the determination module 908 may calculate the second span length 208 based on the running total.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for identifying variable-length records within a data block containing corrupted data, the method comprising:

scanning, by at least one processor, backward from an end of a data block comprising records of variable length, one record at a time, to identify a first span of good records;

scanning, by the at least one processor, forward from a front of the data block, one record at a time, to identify a second span of good records;

identifying, by the at least one processor, a problem region by identifying data that resides between the first span and the second span, wherein the problem region comprises at least one variable-length record having a corrupt control information field; and creating, by the at least one processor, a new record between the first span and the second span that encapsulates the problem region, wherein creating the new record comprises creating a control information field for the new record with a length indicator storing the length of the problem region.

2. The method of claim 1, wherein scanning backward from the end of the data block comprises:

maintaining a count value of units traversed while reading bit patterns in the data block, backward from the end of the data block;

recording the count value and resetting the count value upon reading a bit pattern having a value equal to the count value; and determining, upon arriving at the front of the data block, a length of the first span by summing each recorded count value.

3. The method of claim 1, wherein scanning forward from the front of the data block comprises:

scanning forward from bit pattern to bit pattern by scanning a number of units equal to the value of each bit pattern;

storing a running total of units from the front of the data block to a present location;

obtaining a result, upon arriving at each bit pattern, by subtracting from a total block length a sum of both the running total and a length of the first span; and determining a length of the second span based on the running total upon a number of units equal to the value of a bit pattern at the present location being greater than the result.

4. The method of claim 3, further comprising selecting a first bit pattern from which to traverse forward using one of a default offset and user input.

5. The method of claim 1, further comprising skipping over the new record after the data block has been read into a memory.

6. The method of claim 1, further comprising applying one or more data recovery algorithms to the new record.

7. A computer program product for identifying variable-length records within a data block containing corrupted data, the computer program product comprising a non-transitory computer-readable storage medium storing computer instructions which when executed by at least one computer cause the at least one computer to perform the following:

scan backward from an end of a data block comprising records of variable length, one record at a time, to identify a first span of good records;

scan forward from a front of the data block, one record at a time, to identify a second span of good records;

identify a problem region by identifying data that resides between the first span and the second span, wherein the problem region comprises at least one variable-length record having corrupt control information field; and create a new record between the first span and the second span that encapsulates the problem region, wherein creating the new record comprises creating a control information field for the new record with a length indicator storing the length of the problem region.

8. The computer program product of claim 7, wherein scanning backward from the end of the data block comprises:

maintaining a count value of units traversed while reading bit patterns in the data block, backward from the end of the data block;

recording the count value and resetting the count value upon reading a bit pattern having a value equal to the count value; and determining, upon arriving at the front of the data block, a length of the first span by summing each recorded count.

9. The computer program product of claim 7, wherein scanning forward from the front of the data block comprises:

scanning forward from bit pattern to bit pattern by scanning a number of units equal to the value of each bit pattern;

storing a running total of units from the front of the data block to a present location;

obtaining a result, upon arriving at each bit pattern, by subtracting from a total block length a sum of both the running total and a length of the first span; and determining a length of the second span based on the running total upon a number of units equal to the value of a bit pattern at the present location being greater than the result.

10. The computer program product of claim 9, wherein the computer instructions further cause the at least one computer to select a first bit pattern from which to scan forward using one of a default offset and user input.

11. The computer program product of claim 7, wherein the computer instructions further cause the at least one computer to skip over the new record after the data block has been read into a memory.

12. The computer program product of claim 7, wherein the computer instructions further cause the at least one computer to apply one or more data recovery algorithms to the new record.

13. An apparatus for identifying variable-length records within a data block containing corrupted data, the apparatus comprising:

at least one processor; and at least one memory device coupled to the at least one processor and storing modules for execution on the at least one processor, the modules comprising:

a backward scan module configured to scan backward from an end of a data block comprising records of variable length, one record at a time, to identify a first span of good records;

a forward scan module configured to scan forward from a front of the data block, one record at a time, to identify a second span of good records;

an identification module configured to identify a problem region by identifying data that resides between the first span and the second span, wherein the problem region comprises at least one variable-length record having a corrupt control information field; and a record creation module configured to create a new record between the first span and the second span that encapsulates the problem region, wherein creating the new record comprises creating a control information field for the new record with a length indicator storing the length of the problem region.

14. The apparatus of claim 13, wherein the backward scan module further comprises:

a count module configured to maintain a record of a count value of units traversed while reading bit patterns in the data block, backward from the end of the data block;

a detection module configured to record the count value and to reset the count value upon reading a bit pattern having a value equal to the count value; and a determination module configured to determine, upon arriving at the front of the data block, a length of the first span by summing each recorded count value.

15. The apparatus of claim 13, wherein the forward scan module further comprises:
a step module configured to scan forward from bit pattern to bit pattern by scanning a number of units equal to the value of each bit pattern;
a count module configured to store a running total of units from the front of the data block to a present location;
a computation module configured to obtain a result, upon arriving at each bit pattern, by subtracting from a total block length a sum of both the running total and a length of the first span; and
a determination module configured to determine a length of the second span based on the running total upon a number of units equal to the value of a bit pattern at the present location being greater than the result.

16. The apparatus of claim 13, wherein the modules further comprise a skip module configured to skip over the new record after the data block has been read into a memory.

17. A system for identifying variable-length records within a data block containing corrupted data, the system comprising:
a storage device configured to store a data block comprising variable-length records;
a memory configured to receive the data block;
a transfer module configured to transfer the data block between the memory and the storage device;
a recovery module configured to:
scan backward from an end of a data block comprising variable-length records, one record at a time, to identify a first span of good records;
scan forward from a front of the data block, one record at a time, to identify a second span of good records;
identify a problem region by identifying data that resides between the first span and the second span, wherein the problem region comprises at least one variable-length record having a corrupt control information field; and
create a new record between the first span and the second span that encapsulates the problem region, wherein creating the new record comprises creating a control information field for the new record with a length indicator storing the length of the problem region.

18. The system of claim 17, further comprising a skip module configured to skip over the new record after the data block has been read into the memory.

* * * * *